United States Patent
Jensen et al.

(10) Patent No.: US 9,297,656 B2
(45) Date of Patent: Mar. 29, 2016

(54) SENSOR ARRANGEMENT HAVING CODE ELEMENT

(71) Applicant: HEXAGON TECHNOLOGY CENTER GMBH, Heerbrugg (CH)

(72) Inventors: Thomas Jensen, Rorschach (CH); Knut Siercks, Mörschwil (CH); Peter Kipfer, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 125 days.

(21) Appl. No.: 14/201,385

(22) Filed: Mar. 7, 2014

(65) Prior Publication Data

US 2015/0253136 A1  Sep. 10, 2015

(51) Int. Cl.
| | |
|---|---|
| *G01C 9/06* | (2006.01) |
| *G01C 15/08* | (2006.01) |
| *G01C 15/06* | (2006.01) |
| *G01C 15/00* | (2006.01) |
| *G01C 15/10* | (2006.01) |
| *G01C 9/00* | (2006.01) |

(52) U.S. Cl.
CPC ........ *G01C 15/06* (2013.01); *G01C 9/00* (2013.01); *G01C 15/008* (2013.01); *G01C 15/105* (2013.01); *G01C 2009/066* (2013.01)

(58) Field of Classification Search
CPC ...... G01C 15/008; G01C 15/105; G01C 9/06; G01C 2009/066
USPC .............................................. 33/290, 366.23
See application file for complete search history.

(56) References Cited

U.S. PATENT DOCUMENTS

| | | | | | |
|---|---|---|---|---|---|
| 4,285,595 | A | * | 8/1981 | Fryer | G01D 5/3473 356/150 |
| 4,492,029 | A | * | 1/1985 | Tanaka | G01C 9/06 33/366.14 |
| 6,202,488 | B1 | * | 3/2001 | Cash | B60R 21/013 33/366.23 |
| 6,872,933 | B2 | * | 3/2005 | Wirthlin | G01C 9/06 250/229 |
| 7,692,777 | B1 | * | 4/2010 | Monz | G01C 9/20 356/139.1 |
| 2014/0041241 | A1 | * | 2/2014 | Jaze | G01C 9/12 33/301 |
| 2014/0338205 | A1 | * | 11/2014 | Dumoulin | G01C 15/006 33/228 |

FOREIGN PATENT DOCUMENTS

| | | |
|---|---|---|
| DE | 197 107 22 A1 | 10/1997 |
| DE | 199 267 06 A1 | 12/1999 |
| DE | 199 495 80 A1 | 4/2000 |
| EP | 1 081 459 A1 | 3/2001 |
| EP | 1 200 853 B1 | 3/2003 |
| EP | 1 662 278 A1 | 5/2006 |
| EP | 1 686 350 A1 | 8/2006 |
| EP | 2 219 011 A1 | 8/2010 |
| EP | 1 710 602 B1 | 11/2012 |
| WO | 2007/079600 A1 | 7/2007 |

* cited by examiner

*Primary Examiner* — Christopher Fulton
(74) *Attorney, Agent, or Firm* — Marschoff Brennan

(57) ABSTRACT

Embodiments of the invention include a sensor arrangement for inclination determination with respect to at least one axis. The sensor arrangement may include a code element having a code pattern and a line sensor, which is sensitive at least with respect to one wavelength range, having a reception direction orthogonal to its extension direction. In some embodiments the code element and the line sensor are arranged such that the extension direction of the line sensor and an extension direction of the code element are oriented in the same direction. The code element and the line sensor may be rigidly connected at a spacing of at least 1 mm and at most 10 mm such that a location, which is angle-dependent with respect to the reception direction, of a projection of the code pattern onto the line sensor can be determined by means of the line sensor.

19 Claims, 3 Drawing Sheets

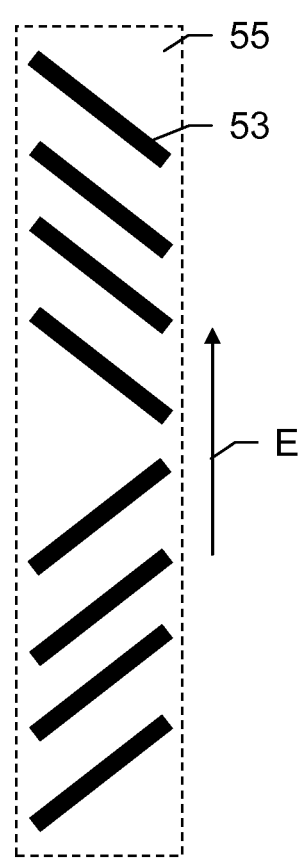
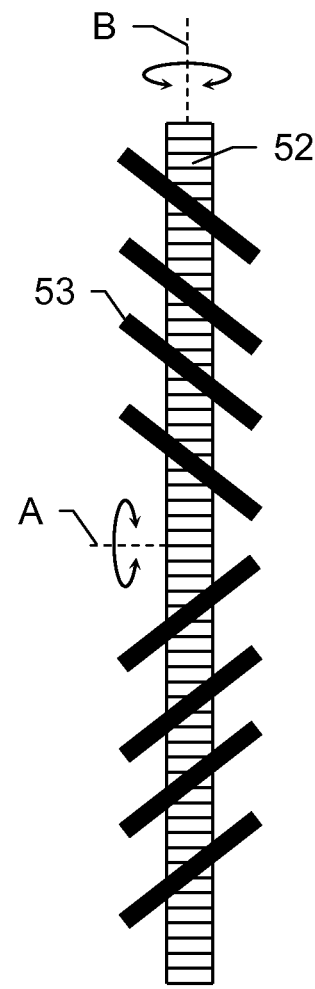
Fig. 5a
Fig. 5b

SENSOR ARRANGEMENT HAVING CODE ELEMENT

FIELD OF THE INVENTION

The invention relates to a sensor arrangement for inclination determination, an inclination determination method, and a computer program product.

Numerous surveying devices have been known since antiquity for surveying a target point. In this case, the direction or angle and usually also a distance from a measuring device to the target point to be surveyed are recorded, and also in particular the absolute position of the measuring device in addition to possibly provided reference points are detected, as spatial standard data.

Generally known examples of geodetic surveying devices are represented by the theodolite, tachymeter, and total station, which is also referred to as an electronic tachymeter or computer tachymeter. A geodetic measuring device of the prior art is described, for example, in published application EP 1 686 350. Such devices have electro-sensory angle measuring functions and possibly distance measuring functions, which permit a determination of direction and distance to a selected target. The angle or distance variables are ascertained in the internal reference system of the device and must optionally still be linked to an external reference system for absolute position determination.

With respect to the design of the surveying devices, numerous different embodiments are known. Thus, for example, modern total stations have microprocessors for the digital processing and storage of detected measurement data. The devices generally have a compact and integrated construction, wherein usually coaxial distance measuring elements and also computer, control, and storage units are provided in one device. Depending on the expansion stage of the total station, motorization of the targeting or aiming apparatus and also—in the case of the use of retroreflectors (for example, a 360° prism) as target objects—means for automatic target search and tracking can also be integrated. As a human-machine interface, the total station can have an electronic display-control unit—generally a microprocessor computer unit having electronic data storage means—having display screen and input means, for example, a keyboard. The measurement data detected in an electro-sensory manner are supplied to the display-control unit, so that the position of the target point can be ascertained, optically displayed, and stored by the display-control unit. Total stations known from the prior art can furthermore have a wireless data interface to establish a wireless connection to external peripheral components, for example, to a handheld data detection device, which can be implemented in particular as a data logger or field computer.

For aiming at or targeting the target point to be surveyed, geodetic surveying devices of this type have a telescopic sight, for example, an optical telescope, as an aiming apparatus. The telescopic sight is generally rotatable about a vertical standing axis and about a horizontal tilt axis in relation to a base of the measuring device, so that the telescopic sight can be aligned on the point to be surveyed by pivoting and tilting. Modern devices can have, in addition to the optical viewing channel, a camera, which is integrated in the telescopic sight and is aligned coaxially or parallel, for example, for detecting an image, wherein the detected image can be displayed in particular as a live image on the display screen of the display-control unit and/or on a display screen of the peripheral device—for example, the data logger—used for remote control. The optic of the aiming apparatus can have a manual focus—for example, an adjustment screw for changing the position of a focusing optic—or can have an autofocus, wherein the change of the focus position is performed by servomotors, for example. For example, such an aiming apparatus of a geodetic surveying device is described in EP 2 219 011. Automatic focusing apparatuses for telescopic sights of geodetic devices are known, for example, from DE 197 107 22, DE 199 267 06, or DE 199 495 80. The construction of this type of telescopic sights of geodetic devices is disclosed in the published applications EP 1 081 459 or EP 1 662 278.

Conventional surveying devices have in the meantime as a standard feature an automatic target tracking function for prisms used as the target reflector (ATR: "automatic target recognition"). For this purpose, for example, a further separate ATR light source and a special ATR detector sensitive for this wavelength (for example, a CCD surface sensor) are additionally integrated in the telescope.

In addition, measuring devices are known which are especially designed for continuous tracking of a target point and coordinative position determination of this point. These can be summarized in general, in particular in the technical field of industrial surveying, under the term "laser tracker". A target point can be reflected in this case by a retro-reflective unit (for example, a cube prism), which is targeted using an optical measuring beam of the measuring device, in particular a laser beam. The laser beam is reflected in parallel back to the measuring device, wherein the reflected beam is detected using a registration unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the detection of the beam, for example, by means of runtime or phase difference measurement.

With respect to the design of laser trackers as surveying devices, modern tracker systems have—increasingly as a standard feature—a sensor for ascertaining an offset of the received measuring beam from a so-called servo-monitoring point. By means of this measurable offset, a position difference between the center of a retroreflector and the point of incidence of the laser beam on the reflector can be determined and the alignment of the laser beam can be corrected or tracked as a function of this deviation such that the offset on the sensor is decreased, in particular is "zero", and therefore the beam is aligned in the direction of the reflector center. By way of the tracking of the laser beam alignment, continuous target tracking of the target point can be performed and the distance and position of the target point can be determined continuously in relation to the surveying device. The tracking can be implemented in this case by means of a controlled alignment change of the deflection mirror, which is movable by a motor and is provided for deflecting the laser beam, and/or by pivoting the targeting unit, which has the beam-guiding laser optic.

Laser trackers of the prior art have at least one distance meter for distance measurement, wherein it can be implemented as an interferometer, for example. Since such distance measuring units can only measure relative distance changes, so-called absolute distance meters are installed in addition to interferometers in current laser trackers. For example, such a combination of measuring means for distance determination is known by way of the product AT901 of Leica Geosystems AG. The interferometers used in this context for distance measurement primarily use gas lasers—as a result of the long coherence length and the measurement range thus made possible—as light sources, in particular HeNe gas lasers. The coherence length of the HeNe laser can be several hundred meters, so that the ranges required in industrial metrology can be achieved using relatively simple interferometer constructions. A combination of an absolute distance meter and an interferometer for distance determination using an HeNe laser is known, for example, from WO 2007/079600 A1.

In many geodetic applications, surveying of points is performed by placing specially designed target objects (for example, surveying poles) on the target point. These target objects usually consist of a surveying stick having a reflector (for example, a 360° prism) for the definition of the measuring route or the measurement point. In the case of such surveying tasks, to control the measuring procedure and to establish or record measuring parameters, a number of data, instructions, language, and further items of information are typically transmitted between target object—in particular a handheld data detection device on the side of the target object—and central measuring device. Examples of such data are information regarding identification of the target object (for example, type of prism used), inclination of the surveying stick, height of the reflector above ground, reflector constants, or measured values such as temperature or air pressure. These items of information or situation-related parameters are necessary to allow high-precision targeting and surveying of the measurement point defined by the surveying pole having prism.

Specially designed target objects or measuring auxiliary instruments are also used in industrial surveying for surveying a measurement point, in particular a plurality of measurement points. These target objects include so-called scanning tools, which are positioned with the contact point thereof on the measurement point at an object and thus allow surveying of the point, and also contactlessly measuring sensors (for example, mobile optical scanning units).

The position of this reflector can be determined reliably and precisely by means of an interaction of an above-mentioned measurement system with a respectively employed reflector unit. However, the position of the reflector alone is usually not sufficient for measurements of a specific measurement point, since the reflector does not directly specify the measurement point to be determined, but rather this measurement point is surveyed by means of the target object or the auxiliary instrument (for example, a surveying stick in geodesy).

A determination of the spatial orientation or of an inclination in relation to respectively relevant spatial directions of the respective auxiliary instrument is therefore additionally necessary, to derive the measurement point to be determined by means of the instrument together with the specific position of the reflector arranged on the auxiliary instrument. Such an orientation can be determined, for example, by means of an inclination sensor, which is provided in a specific position and location in relation to the reflector, or—as is typically used for laser trackers—by means of markings arranged on the auxiliary instrument, wherein the positions of the markings on the scanning instrument are precisely known, and by image processing of an image in which these markings are detected in a position-sensitive manner (and which can be detected by an image detection unit on the part of the surveying device).

Such solutions for orientation determination have the disadvantage, for example, that in addition to the reflector unit which is necessarily required for the position determination, multiple further components must be provided on the measuring auxiliary instrument and thus an increased complexity is provided with respect to the design of such instruments and/or the instruments having such additional components have relatively large spatial dimensions. In addition, a determination of the alignment is only performed in the scope of the respective sensor precision. Furthermore, the additional components each hold additional error sources with respect to the position and orientation determination (for example, the failure of an LED or an unknown offset of the inclination sensor in relation to the reflector, due to mechanical strain, results in lower precision or corrupted values).

Solutions for corresponding sensor units for orientation determination according to EP 1 200 853 or EP 1 710 602 also have similar disadvantages with respect to achievable precisions, since solely one passage opening for the beam is provided and therefore the detection of the beam incidence point is decisively dependent on the measurement distance and the beam quality, and the structural complexity and size of the structure.

BACKGROUND

Some embodiments of the present invention include an improved device, which allows more reliable and precise location determination for surveying purposes and has a compact structural form at the same time.

Some embodiments of the invention include a sensor arrangement, which provides an inclination determination, in a more compact and robust construction.

SUMMARY

The invention relates to a sensor arrangement for inclination determination with respect to at least one axis, having a code element having code pattern and having a line sensor, which is sensitive at least with respect to one wavelength range, having a reception direction orthogonal to its extension direction. The code element and the line sensor are arranged in this case such that the extension direction of the line sensor and an extension direction of the code element are oriented in the same direction. According to the invention, the code element and the line sensor are rigidly connected at a spacing of at least 1 mm and at most 10 mm such that a location, which is angle-dependent with respect to the reception direction, of a projection of the code pattern onto the line sensor can be determined by means of the line sensor.

In this context, i.e., in the scope of the present invention, a geometrical spacing between the two elements—code element and line sensor—is understood as the spacing (of at least 1 mm and at most 10 mm). Therefore, the actual structural distance of these elements, i.e., a shortest connection of the elements, is thus to be understood and defined. The spacing can be represented, for example, by the linear distance from the boundary surface of the code element up to the opposing boundary surface of the line sensor or by the distance of the respective centers of gravity of the two elements.

In addition, an optical spacing is defined by this arrangement of the code element in relation to the line sensor, wherein the index of refraction n of a medium (for example, air or glass) located between the code element (or code pattern) and the line sensor is additionally taken into consideration for this purpose. The optical spacing is in this case the geometric distance L (geometric spacing of at least 1 mm and at most 10 mm) divided by the index of refraction n of the interposed medium (L/n). The optical spacing therefore differs from the geometric spacing as a function of the existing index of refraction n of the interposed medium or the multiple interposed media (for example, air and glass).

A compact arrangement having a code pattern and a sensor is thus provided, wherein upon illumination of the arrangement, the code pattern is projected onto the sensor and the inclination of the arrangement in relation to an illumination direction can be determined from the location of the projection. By way of the spacing according to the invention of the sensor in relation to the code element, a suitable image of the code pattern on the line sensor is additionally provided, so that a precise detection of the location of the projection by the sensor and therefore a correspondingly precise inclination determination can be performed. The spacing, which is permanently set by the fixedly spaced positioning of the elements, acts like a lever on the displacement of the projected code, whereby the sensitivity of the sensor arrangement may be adapted.

According to one special embodiment of the invention, the sensor arrangement has a body which is at least partially transparent with respect to the wavelength range of the line sensor, in particular a glass body or plastic body, wherein the body has the code element, in particular wherein the code pattern is provided on or in the body, and/or the body is implemented as the code element.

In the case that the body has the code element, the spacing d of at least 1 mm and at most 10 mm is predefined in particular by the spatial dimensions of the body, wherein the code element (having code pattern) is provided on a first end side of the body and the line sensor is arranged on a second end side of the body opposite to the first end side in particular, in particular wherein the second end side and a detection surface of the line sensor form a shared contact surface. The body can be embodied as cuboid, for example, wherein the code pattern and the line sensor are arranged on respective opposing (parallel) surfaces (=first and second end sides) of the body.

Furthermore, according to a further embodiment, the sensor arrangement can have a spacer component, by means of which the code element is rigidly positioned in relation to the line sensor. Such a spacer component can be, for example, a holding device (for example, made of a material which, with respect to thermal influences, has no or only slight shape and/or dimension changes due to a small coefficient of thermal expansion), which fixes both the code element and also the sensor in a defined position. For example, the spacer component can be manufactured as a housing made of Zerodur. Alternatively, materials comparable to Zerodur can be used in regard to the thermal expansion behavior with respect to respective temperature ranges.

In regard to the design of the code element or the code pattern of the code element, according to a preferred embodiment of the invention, the code element has regions of different transmissivity at least with respect to optical radiation having a wavelength $\lambda_B$ from the at least one wavelength range, wherein the code pattern is represented by the regions of different transmissivity, in particular wherein the regions of different transmissivity define a line pattern having different line spacings and/or line widths.

According to a more special embodiment of the invention, the regions of different transmissivity are designed such that the code pattern defines at least one linearly extending radiation-transmissive transmission region, in particular a radiation-transmissive region acting as a gap, having a gap width b. As a result of a projection of the code pattern, at least one corresponding light strip thus results.

In particular, the at least one transmission region is provided according to the invention having gap width b and the code element is arranged with spacing d in relation to the line sensor such that the diffraction condition $d \geq b^2/\lambda_B$, in particular the Fraunhofer diffraction condition $d \gg b^2/\lambda_B$, is fulfilled, in particular for the projection of the code pattern upon an illumination of the code element using the optical radiation of the wavelength $\lambda_B$.

Furthermore, the at least one transmission region can be designed according to the invention and the code element can be arranged with spacing d in relation to the line sensor such that essentially far field diffraction conditions are provided for a diffraction of the optical radiation at the sensor arrangement.

The regions of different transmissivity are designed according to a further preferred embodiment according to the invention such that the code pattern along an extension axis of the code element has a plurality of the radiation-transmissive transmission regions having respective (possibly different) gap widths b, wherein the radiation-transmissive transmission regions are arranged substantially parallel to one another and a gap spacing s is respectively defined between each two adjacent transmission regions. The gap spacing s can be of different sizes between each two adjacent transmission regions. The code pattern therefore defines a sequence of light-transmissive regions, which act as gaps and can be different with respect to gap widths b and gap spacings s.

According to the invention, in addition, the gap spacing s can respectively be provided and the code element can be arranged with spacing d in relation to the line sensor such that the condition $d \neq 2 \cdot n \cdot s^2/\lambda_B$ is fulfilled, wherein n is an arbitrary number from the set of natural numbers, in particular for the projection of the code pattern upon an illumination of the code element using the optical radiation of the wavelength $\lambda_B$.

According to a further embodiment of the invention, the gap width b with respect to the extension axis of the code element is at least 0.05 mm, and also in particular at most 0.2 mm, and the gap spacing s between at least two adjacent transmission regions (also with respect to the extension axis of the code element) is at least 0.5 mm, and also in particular at most 5 mm. The regions of different transmissivity are designed accordingly for this purpose.

With respect to the design of the code element or the code pattern, the code is therefore formed according to the invention in particular from thin radiation-transmissive gaps having (in relation thereto) large intermediate spacings. This ratio of gap widths b and gap spacings s of the code is selected as a result of the preferred Fraunhofer diffraction and the Talbot length (for nth orders), which limits the design.

From these conditions, a code especially results having, for example, 0.05 mm wide transmittive gaps and an alternating period (=spacing between the gaps) of 0.6 to 0.9 mm. Thus, approximately 12 periods can be imaged on an 8 mm long line array (line sensor). The spacing d between code and sensor can be 1 mm to 10 mm in this case, wherein a shorter spacing is preferable if there is a lack of light, but greater spacings increase the resolution. With spacing d=2 mm, an angle precision for the inclination of 30 cc over a measuring range of 40 gon is achieved; in the case of d=5 mm, a precision of at least 10 cc is achieved.

At a gap width b of 0.05 mm, a spacing of code to sensor of 5 mm (in the case of perpendicular incident light), a sensor length of 8 mm, and a measuring range for the sensor arrangement of ±45° inclination, the standard deviation is lowest for the angle determination for the gap spacings 0.6 mm, 0.85 mm, and 1.1 mm distributed on 8 mm sensor length.

The regions of different transmissivity are especially designed according to the invention such that an unambiguous location determination of the code pattern imaged onto the line sensor can be executed on the line sensor from a detected location of the regions on and using the line sensor.

For this purpose, for example, a nonperiodic structuring of the code pattern is advantageous (i.e., in particular different gap spacings b).

With respect to a measuring range for the sensor arrangement, the sensor arrangement is preferably implemented according to the invention such that an inclination of the sensor arrangement with respect to the at least one axis can be derived from the location, which can be determined by means of the line sensor, of the projection of the code pattern on the line sensor within an inclination angle range of up to ±45° with respect to the axis.

The sensor arrangement must be actively illuminated for the inclination determination. At least one collimator having a laser diode, which is located on a telescope body, can be used for this purpose, or wherein the measurement radiation is aligned by means of an alternative beam deflection unit (for example, beam alignment using a laser tracker or a total station). For example, an emission wavelength of the diode of 660 nm is provided for this purpose, since crosstalk between the units can be avoided by a large spectral distance thus achieved to further measuring units (for example, distance meter having a measurement laser at 795 nm or 905 nm). If multiple collimators and diodes are arranged, furthermore various divergences can be set by the collimators, wherein, for example, one covers the close range between 2 m and 7 m measurement distance (=distance between the measuring device and the sensor arrangement) and the other covers the long range between 6 m and 15 m. To avoid a parallax, the measuring beams can be coupled in via a beam combiner, for example.

The invention additionally relates to an inclination determination method with respect to at least one axis having illumination, which is oriented in the same direction as the axis, in particular collimated, of a code element, so that an angle of incidence is defined by an alignment of the axis in relation to the code element, and having a position-sensitive detection of a projection of a code pattern generated by the illumination of the code element. In addition, a derivation of an inclination of the code element with respect to the at least one axis is performed from a location, which can be determined by means of the position-sensitive detection, of the projection in relation to the code element, wherein the location of the projection in relation to the code element is dependent on the angle of incidence. The code element and a projection surface on which the projection is generated, in particular a line sensor for the position-sensitive detection, are rigidly connected at a spacing of at least 1 mm and at most 10 mm.

The sensor arrangement according to the invention is provided in particular on a surveying pole or a construction machine to determine the inclination of the surveying pole or a spatial orientation of the construction machine. For this purpose, the sensor arrangement has corresponding fastening means, for example, a receptacle for the surveying pole. For example, the surveying pole is used for surveying target points in the terrain, wherein an exact position of the pole and the spatial orientation thereof must be determined for such a target point. For the position determination, the surveying pole typically additionally has a retroreflector, which is targeted by means of a geodetic surveying device, whereby the position thereof can be precisely determined according to generally known principles of geodesy. The inclination determination for the surveying pole is also performed jointly with the position determination, in that an illumination of the sensor arrangement is also performed originating from the geodetic device and thus a projection of the code pattern onto the sensor and, based thereon, the inclination determination for the surveying pole are carried out.

A user of the surveying pole can thus place it on a target point in arbitrary alignment and ascertain a precise position value for the target point by way of the above-described position and orientation determination.

Alternatively thereto, the sensor arrangement can be arranged on a scanning tool used in industrial surveying or similar surveying instruments and a corresponding position determination can thus be performed.

Furthermore, the invention relates to a computer program product, which is stored on a machine-readable carrier, for controlling the illumination of the code element and the detection of the projection and for executing the derivation of the inclination of the code element of the inclination determination method according to the invention, in particular when the computer program product is executed on a control and processing unit of a surveying device.

BRIEF DESCRIPTION OF THE DRAWINGS

The method according to the invention and the device according to the invention will be described in greater detail hereafter solely as examples on the basis of concrete exemplary embodiments which are schematically shown in the drawings, wherein further advantages of the invention will also be discussed. Specifically:

FIGS. 5a-b show a further embodiment according to the invention of a sensor arrangement having a code element having code pattern and a line sensor.

DETAILED DESCRIPTION

Figure 1:
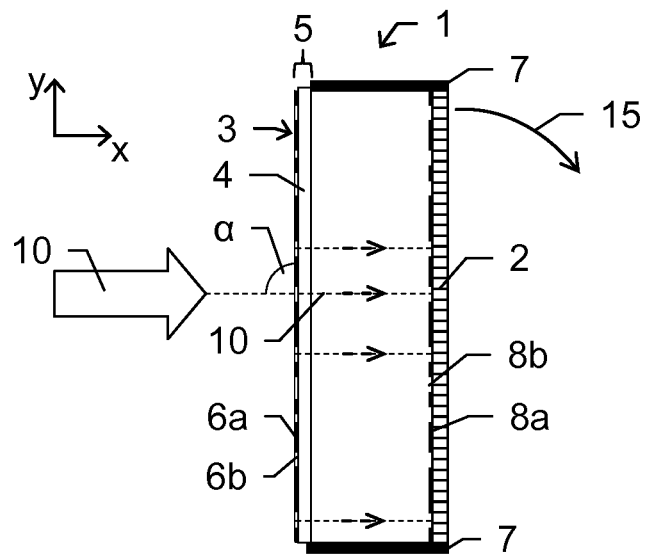
FIG. 1 shows a side view of a first embodiment of a sensor arrangement according to the invention.

FIG. 1 shows a side view of a first embodiment of a sensor arrangement 1 according to the invention having a sensor 2, which is implemented as a line sensor, for detecting electromagnetic radiation 10 incident on the sensor 2, in particular radiation of a defined wavelength range. The sensor arrangement 1 additionally has a code element 5 having a substrate 4 and a code pattern 3 applied to the substrate 4.

The substrate 4 is embodied in this case such that the illumination radiation 10 used to illuminate the sensor arrangement 1, which radiation is embodied, for example, by the measurement radiation (for example, laser radiation) of a surveying device (for example, total station, theodolite, or laser tracker), can radiate through the substrate 4, i.e., the substrate 4 is embodied as transmissive at least with respect to the wavelength of the illumination radiation 10 or with respect to an illumination wavelength range. The substrate 4 can be manufactured, for example, on a correspondingly transmissive plastic or from a glass corresponding to these requirements.

The illumination radiation is typically represented by substantially collimated and coherent radiation.

The code element 5 has different regions 6a, 6b, wherein the respective dark regions 6a are implemented as opaque for the illumination radiation 10 and the regions 6b are implemented as transmissive for the illumination radiation. By way of a specific arrangement or—as set forth here—a line-by-line sequence of regions 6a and regions 6b (with respect to the y direction), a code pattern is provided by means of the code element 5, which is projectable on the sensor 2 (in the form of lines) upon illumination.

Therefore, a projection corresponding to the code pattern 3 is generated on the line sensor 2 upon illumination. In other words, a shadow according to the code pattern 3 provided by the code element 5 arises in this case on the sensor 2, wherein the location of the individual shadows 8a, caused by the dark regions 6a, on the sensor 2 is dependent on an angle of incidence $\alpha$ of the illumination radiation 10 (cf. FIG. 2). Upon an illumination of the sensor arrangement 1 using the illumination radiation 10 at an angle of incidence $\alpha$ of 90°, as shown here, the code pattern 3 is imaged in its entirety and without offset on the sensor 2.

By way of the line sensor 2, the respective illuminated and dark regions 8a, 8b (generated by the projection of the code pattern 3) on the sensor 2 are detectable and the relative location thereof on the sensor 2 can be determined. The present angle of incidence $\alpha$ can in turn be derived from the determined location of the individual light strips 8b and/or shadows 8a and/or the entirety of the light 8b and dark 8a regions, and a relative inclination of the sensor arrangement in relation to the direction of incidence of the illumination radiation 10 can be concluded. For this purpose, the sensor arrangement 1 is preceded by a calibration, wherein the location of the projection of the code pattern 3 on the sensor is determined for at least one illumination state at a defined angle of incidence $\alpha$.

The code pattern 3 defined as the line code, which has lines (gaps) of different width by way of the transmissive regions 6b and having different line spacings (definable by the size of the opaque regions 6a) of adjacent lines and the lines of which are arranged substantially parallel to the detection surface of the line sensor 2, therefore generates lines on the sensor 2 upon illumination, the locations of which on the sensor 2 can be determined by the line sensor 2, which detects in a position-sensitive manner with respect to the y axis. If the inclination of the sensor arrangement 1 changes in the inclination direction 15 or in the x-y plane, the location of the individual lines projected onto the sensor 2 or the entirety of the lines thus changes, from which the inclination value for the inclination direction 15 can be derived (cf. FIG. 2). This determination can, for example, be based on the performed calibration and occur by processing of known position and alignment values, which specify a relative position and alignment of the code element 5 in relation to the sensor 2.

For the reliable determination of the angle of incidence $\alpha$ from the location of the projection of the code pattern 3 on the sensor 2, a spacer component 7 is provided, which holds the code carrier 3 in a permanent and fixed position in relation to the sensor 2. It is thus ensured that the code pattern is always provided rigidly in a specific and defined position and alignment and at a defined spacing in relation to the line sensor 2 and the code pattern 3 is projected with a defined offset onto the sensor 2 as a function of the inclination of the arrangement 1. The location of the projection of the pattern on the sensor 2 is therefore determined by the inclination of the sensor arrangement 1 in the x-y plane or with respect to the inclination direction 15 and by the spacer component 7.

The spacing between line sensor 2 and code element 5 is between 1 mm and 10 mm according to the invention and is predefined by the spacer component 7.

Figure 2:
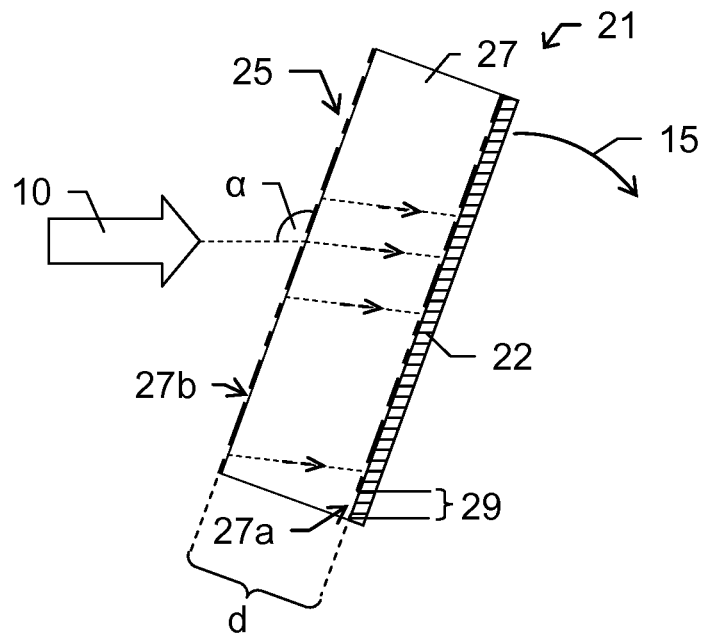
FIG. 2 shows a side view of a further embodiment of a sensor arrangement according to the invention.

FIG. 2 shows a side view of a further embodiment of a sensor arrangement 21 according to the invention. The sensor arrangement 21 has a line sensor 22 (for example, implemented as a CCD sensor) and a code element 25, which provides a code pattern having light-transmissive gaps of different width (gap width) and having different gap spacings.

The code element 25 is arranged on a body 27, which is transmissive for the illumination radiation 10. The sensor 22 is arranged on a first end side 27a of the body 27 and the code element 25 is provided on a second end side 27b of the body 27. Furthermore, the body 27 is designed in this case such that fixed and rigid positioning of the code element 25 in relation to the sensor 22 is ensured, whereby due to this arrangement, for example, a high level of robustness is provided in relation to external influences (for example, shocks or thermal deformation). The code element 25 or code pattern is applied in the embodiment shown directly on the body 27 (code element 25 and body 27 are implemented in one piece), i.e., the gaps or lines providing the code pattern are applied to the body 27 (for example, imprinted or engraved).

According to an alternative embodiment—not shown here—the code element can be applied as a film printed with the code pattern onto the body, in particular glued on by means of adhesive.

Due to the specific design of the body 27, the code element 25 is rigidly connected to the sensor 22 at a specific spacing d (from 1 mm to 10 mm). This spacing d can be set by a body 27 respectively adapted to the desired requirements. As a function of this spacing d, a shadow image projected onto the sensor 22 can be provided with a near field diffraction pattern (Fresnel diffraction).

For a reliable and precise analysis of the projection of the code pattern on the sensor 22, the spacing d between sensor 22 and code pattern is especially selected such that for the diffraction on the code element 25, or at the individual gaps generated by the lines of the code pattern, far field conditions apply. Instead of a purely Fresnel diffraction, Fraunhofer diffraction then occurs, i.e., a resulting intensity distribution of the diffracted radiation on the sensor as in at infinite range.

In the case of an alternative preferred selection of the spacing d, a diffraction pattern which is also suitable can be provided as a diffraction transition between Fresnel and Fraunhofer diffraction, wherein this is referred to as providing the line sensor 22 in a transition range in relation to the code pattern 25.

Furthermore, in the case of the design of the sensor arrangement 21, in particular with respect to the generation of a desired diffraction pattern, in addition to a suitable spacing d, in particular a matching design of the code pattern is considered, i.e., in the case of a line code, the arrangement and dimensioning of the light-transmissive gaps is set accordingly (for example, gap spacing in relation to gap width). A detailed description and embodiment of a code arrangement according to the invention is described in conjunction with FIG. 3.

The illumination radiation 10 is incident in the case shown (FIG. 2) at an angle of incidence $\alpha > 90°$ on the sensor arrangement 21, whereby the lines of the code pattern are projected with a certain offset 29 (with respect to incidence of the illumination radiation at an angle of incidence $\alpha = 90°$) onto the sensor 22.

The line sensor 22 is implemented at least with respect to the y direction for the position-sensitive detection of electromagnetic radiation. The precision of the detection of the radiation incident on the sensor 22 is dependent in this case at least on the resolution capability of the sensor and the resulting diffraction pattern, wherein precise localization of intensity patterns having steep flanks (as exist in the case of Fresnel diffraction) is more difficult and inaccurate to implement than a localization of intensity patterns having flatter flanks (as provided in the case of Fraunhofer diffraction or the described diffraction transition). The precision of the position determination of the radiation incident on the sensor 22 thus increases upon leaving the diffraction close range and reaching the transition range.

The offset 29 of the projected code pattern on the sensor 22 can therefore be determined from the illumination radiation 10 which can be detected and a corresponding sensor signal can be generated. From the determined offset 29 or by means of the generated sensor signal in turn, an inclination (with respect to the inclination direction 15) of the sensor arrangement 21 in relation to the beam direction of incidence of the illumination radiation 10 can then be derived, i.e., the angle of incidence α can be determined.

A sensor arrangement 1, 21 according to the invention—as shown in FIGS. 1 and 2—is especially used with a surveying device, in particular a theodolite, a total station, or a laser tracker. The surveying device typically has in this case a base which defines a standing axis, a structure, which is connected to the base so as to be movable and is rotatable in relation to the base about the standing axis, wherein the structure defines a tilt axis, and a targeting unit (in particular a telescopic sight), which is connected to the structure so as to be movable is pivotable about the tilt axis in relation to the structure, in particular is rotatable, and is provided for emitting measurement radiation. The tilt axis is substantially orthogonal to the standing axis.

In addition, a beam source for generating illumination radiation, in particular the measurement radiation, and an angle and distance measurement functionality are provided.

The surveying device has a control and processing unit for controlling targeting of the sensor arrangement and for determining a position and inclination of the sensor arrangement. During the targeting of the sensor arrangement, the inclination of the sensor arrangement in relation to an illumination direction (axis of the light incidence) of the illumination radiation, in particular the measurement radiation, with respect to at least one inclination direction can be derived from an interaction of the illumination radiation, in particular the measurement radiation, and the sensor arrangement.

The laser radiation, using which a distance to a reflective target is determined, can thus be used as illumination radiation for the sensor arrangement. Alternatively or additionally, an additionally provided radiation source can also be provided for the emission of the illumination radiation.

Figure 3:
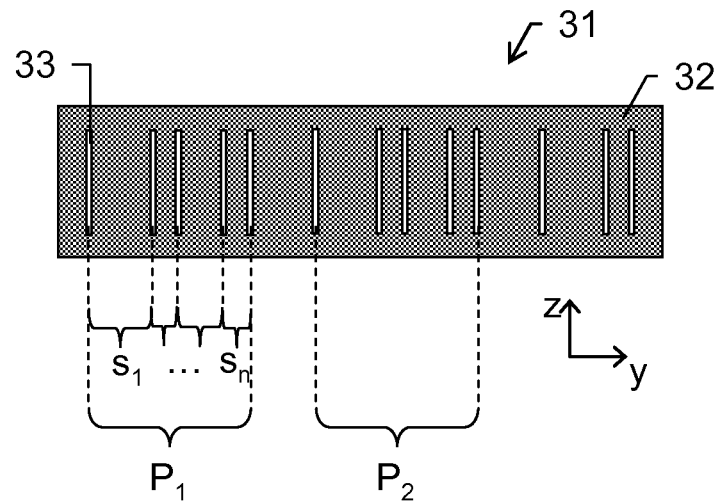
FIG. 3 shows an embodiment of a code element as such a code element is usable in a sensor arrangement according to the invention.

FIG. 3 shows an embodiment for a code element 31 (in a top view), as such a code element can be used in a sensor arrangement according to the invention. By way of the design of this code element 31, i.e., by way of a surface 32 which is opaque for a wavelength or a wavelength range with respect to the illumination radiation (in the y-z plane, wherein the y direction corresponds to that according to FIG. 1) and by way of regions 33 within this surface 32, which are transmissive for the illumination radiation (or with respect to the wavelength range), a sequence of gaps 33 (=transmissive regions 33) is defined. The optical grating thus generated has small gap widths and large gap spacings $s_1 \ldots s_n$ in relation thereto.

Figure 4A:
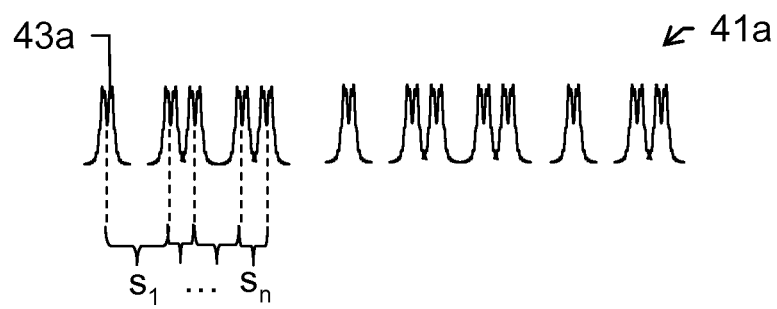
FIGS. 4a-b each show a resulting intensity distribution for a code element according to the invention.
Figure 4B:
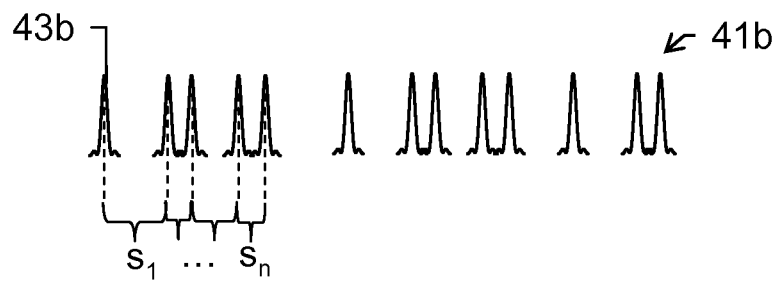

In addition, the grating has a nonhomogeneously periodic structuring, so that upon a projection of the illumination radiation through the gaps 33 onto the sensor, the location of the projection on the sensor can be determined unambiguously. A specific number of gaps 33 can—as shown here—form a gap group $P_1$, $P_2$, wherein such a group $P_1$, $P_2$ can repeat periodically on the code element 31. According to specific embodiments of the code element 31, the gap spacings $s_1 \ldots s_n$ are selected to be between 0.5 mm and 5 mm and the gap widths $b_1 \ldots b_n$ to be between 0.05 mm and 0.2 mm. FIG. 4a and FIG. 4b each show an intensity distribution 41 suitable for the inclination determination upon use of a code element 31 according to FIG. 3, as this intensity distribution results on the projection surface upon an illumination of the code element 31 as this intensity distribution results upon the presence of a suitable spacing d between the code element 31 and a projection surface (for example, in the form of a sensor, in particular a line sensor). For the illustrated intensity distributions 41a-b, for each individual intensity distribution 43a-b, the diffraction of the illumination radiation is taken at a corresponding individual gap 33 of the code element 31, without taking into consideration possible mutual influence of the diffraction effects generated by the individual gaps 33, for example, due to a superposition of the individual diffraction patterns of multiple individual gaps 33.

For example, the code element 31 can be specifically implemented for illumination radiation having a wavelength of 660 nm.

An intensity distribution 41a according to FIG. 4a for the individual gaps 33 results if the spacing d between the projection surface and the code element 33 is provided such that the condition $$d \geq b^2/\lambda_B$$

is fulfilled, wherein $\lambda_B$ is the wavelength of the illumination radiation. For this purpose, for example, a spacing d=2 mm and a gap width b=0.1 mm are selected. In this case, this is no longer purely Fresnel diffraction which occurs in a close range, i.e., upon fulfillment of the diffraction condition $$d << b^2/\lambda_B$$

but rather a diffraction appearance which occurs in a transition range between Fresnel diffraction and Fraunhofer diffraction.

An intensity distribution 41b according to FIG. 4b for the individual gaps 33 results if the spacing d between the projection surface and the code element 33 is provided such that the condition $$d >> b^2/\lambda_B$$

is met. As a result, a purely Fraunhofer diffraction ("at infinite range") is then obtained for each individual gap. For this purpose, for example, a spacing d=5 mm and a gap width b=0.05 mm are selected.

Both the intensity curves for the diffraction appearance in the transition range 43a and also the intensity curves for the Fraunhofer diffraction 43b have flanks (slopes of the curves) which are not sufficiently steep that the location thereof could not be determined by means of a sensor in the scope of the required precision, as is the case for intensity curves of the Fresnel diffraction, however.

FIG. 5a and FIG. 5b show a further embodiment according to the invention for a code element 55 having a code pattern 53 and an arrangement of the code element 55 together with a line sensor 52, onto which a projection of the code pattern 53 occurs upon corresponding illumination of the code element 55. The code pattern 53 is designed here as light-opaque for the illumination radiation, however, the optical properties of code pattern 53 and the surface which encloses or defines the code pattern 53 can be exchanged.

The provided code pattern 53 has a diagonal pattern with respect to the extension direction E of the code element 55, having different diagonal directions of the individual pattern parts (stripes). A first part of the pattern has a pattern alignment having a first angle in relation to the extension direction E, while a second part has a pattern alignment having a second angle, which is different from the first angle.

Using such a code pattern 53, not only can a tilt of the sensor arrangement about a first axis A be determined, but rather additionally also a rotation about a second axis B. An unambiguous inclination determination with respect to two axes can thus be carried out.

In the event of a tilt about the axis A, the code pattern 53 projected onto the line sensor 52 is displaced in the direction of the extension direction E. The correspondingly changed projection can be detected by means of the sensor 52 and an offset of the projection and an amount (and a direction) for the tilt about the axis A can be determined therefrom.

In the event of a rotation of the arrangement about the axis B, the code pattern 53 projected onto the line sensor 52 is displaced in a direction orthogonal to the extension direction E. The projection thus changed accordingly can similarly be detected by means of the sensor 52 and an offset of the projection and an amount (and a direction) for the rotation about the axis B can be determined therefrom.

The respective offset of the projection can be derived from the combination of the respectively illuminated or shaded segments of the line sensor 52.

Due to the different alignments of the code pattern, the mutual determination for both axes is unambiguous. Congruency of the projected code pattern in the event of simultaneous tilting and rotation with a projection which would arise in the event of an alternative orientation of the arrangement is thus precluded.

Furthermore, such a code pattern 53 also offers in particular the advantages with respect to precision as a pattern according to one of FIGS. 1-3.

According to the invention, the code element 55 is arranged rigidly in relation to the line sensor 52 such that the extension direction E of the code element 55 is oriented in the same direction as, in particular parallel to, the extension direction of the line sensor 52.

It is obvious that these illustrated figures only schematically illustrate possible exemplary embodiments. The various approaches can also be combined according to the invention with one another and with methods for inclination or location determination of an object and with measuring devices of the prior art. The aspects according to the invention can thus be used in particular in conjunction with geodetic surveying devices—such as total stations and tachymeters—or industrial surveying devices—for example, laser trackers.

What is claimed is:

1. A sensor arrangement for inclination determination with respect to at least one axis comprising:
    a code element having a code pattern and
    a line sensor, which is sensitive at least with respect to one wavelength range, having a reception direction orthogonal to its extension direction,
    wherein the code element and the line sensor are arranged such that the extension direction of the line sensor and an extension direction of the code element are oriented in the same direction, wherein the code element and the line sensor are rigidly connected at a spacing of at least 1 mm and at most 10 mm such that a location, which is angle-dependent with respect to the reception direction, of a projection of the code pattern onto the line sensor can be determined by means of the line sensor.

2. The sensor arrangement according to claim 1, wherein the sensor arrangement includes a body which is at least partially transparent with respect to the wavelength range of the line sensor, and wherein the body has the code element.

3. The sensor arrangement according to claim 2, wherein the spacing of at least 1 mm and at most 10 mm is predefined by the spatial dimensions of the body, and the code element is provided on a first end side of the body and the line sensor is arranged on a second end side of the body opposite to the first end side, wherein the second end side and a detection surface of the line sensor form a shared contact surface.

4. The sensor arrangement according to claim 1, wherein the sensor arrangement includes a body which is at least partially transparent with respect to the wavelength range of the line sensor, and wherein the body has the code element on or in the body.

5. The sensor arrangement according to claim 1, wherein the sensor arrangement includes a body which is at least partially transparent with respect to the wavelength range of the line sensor, and wherein the body is designed as the code element.

6. The sensor arrangement according to claim 1, wherein the sensor arrangement includes a glass body or a plastic body, which is at least partially transparent with respect to the wavelength range of the line sensor.

7. The sensor arrangement according to claim 1, wherein the sensor arrangement has a spacer component, by means of which the code element is rigidly positioned in relation to the line sensor.

8. The sensor arrangement according to claim 1, wherein the code element has regions of different transmissivity at least with respect to optical radiation having a wavelength from the at least one wavelength range, wherein the code pattern is represented by the regions of different transmissivity, wherein the regions of different body transmissivity define a line pattern having different line spacings and/or line widths.

9. The sensor arrangement according to claim 8, wherein the regions of different transmissivity are designed such that the code pattern defines at least one linearly extending radiation-transmissive transmission region having a gap width.

10. The sensor arrangement according to any one of claim 9, wherein the at least one transmission region includes a gap width and the code element is arranged with spacing in relation to the line sensor such that the diffraction condition $d \leq b^2/\lambda_B$ and/or the Fraunhofer diffraction condition $d \gg b^2/\lambda_B$ are fulfilled, wherein for the projection of the code pattern upon an illumination of the code element using the optical radiation of the wavelength ($\lambda_B$).

11. The sensor arrangement according to any one of claim 9, wherein the at least one transmission region is designed and the code element is arranged with spacing in relation to the line sensor such that essentially far field diffraction conditions are provided for a diffraction of the optical radiation at the sensor arrangement.

12. The sensor arrangement according to any one of claim 9, wherein the regions of different transmissivity are designed such that the code pattern along an extension axis of the code element has a plurality of the radiation-transmissive transmission regions having respective gap widths, wherein the radiation-transmissive transmission regions are arranged substantially parallel to one another and a gap spacing is respectively defined between each two adjacent transmission regions.

13. The sensor arrangement according to any one of claim 12, wherein the gap spacing is respectively provided and the code element is arranged with spacing in relation to the line sensor such
    that the condition $d \neq 2 n s^2/\lambda_B$ is fulfilled, wherein n is an arbitrary number from the set of natural numbers, wherein for the projection of the code pattern upon an illumination of the code element using the optical radiation of the wavelength.

14. The sensor arrangement according to any one of claim 9, wherein
    the gap width (b) with respect to the extension axis of the code element is at least 0.05 mm, mm, and/or the gap spacing (s) between at least two adjacent transmission regions is at least 0.5 mm.

15. The sensor arrangement according to claim 8, wherein the regions of different transmissivity are designed such that an unambiguous location determination of the code pattern imaged onto the line sensor can be executed on the line sensor from a detected location of the regions on and using the line sensor.

16. The sensor arrangement according to claim 1, wherein the sensor arrangement is implemented such that an inclination of the sensor arrangement with respect to the at least one axis can be derived from the location, which can be determined by means of the line sensor, of the projection of the code pattern on the line sensor within an inclination angle range of up to ±45° with respect to the axis.

17. An inclination determination method with respect to at least one axis, the method comprising:
   illuminating in the same direction as the axis of a code element, so that an angle of incidence is defined by an alignment of the axis in relation to the code element,
   detecting a position-sensitive of a projection of a code pattern generated by the illumination of the code element, and
   deriving an inclination of the code element with respect to the at least one axis from a location, which can be determined by means of the position-sensitive detection, of the projection in relation to the code element, wherein the location of the projection in relation to the code element is dependent on the angle of incidence,
   wherein the code element and a projection surface, on which the projection is generated are rigidly connected at a spacing of at least 1 mm and at most 10 mm.

18. The inclination determination method according to claim 17, wherein the illuminating is collimated.

19. A computer program product, which is stored on a non-transitory machine-readable carrier, for controlling the illumination of the code element and the detection of the projection and for executing the derivation of the inclination of the code element of a method according to claim 17.

* * * * *